United States Patent [19]
Carow

[11] 3,766,456
[45] Oct. 16, 1973

[54] ROTATING ELECTRICAL MACHINE
[76] Inventor: Donald W. Carow, 167 Flying Mist Isle, Foster City, Calif.
[22] Filed: June 4, 1970
[21] Appl. No.: 43,420

[52] U.S. Cl. .................. 318/138, 318/254, 310/168
[51] Int. Cl. ........................................ H02k 29/00
[58] Field of Search .................. 310/168, 263, 155, 310/266, 554, 268, 156, 261, 164; 318/254, 138, 132

[56] References Cited
UNITED STATES PATENTS

| | | | |
|---|---|---|---|
| 1,961,782 | 6/1934 | Rich | 310/155 |
| 3,435,313 | 3/1969 | Siefert et al. | 318/132 X |
| 3,469,133 | 9/1969 | Stcherbatcheff | 310/164 |
| 3,435,266 | 3/1969 | Jarrett et al. | 310/164 |
| 579,012 | 3/1897 | Scheeffer | 310/168 |
| 606,863 | 7/1898 | Gutmann | 310/168 |
| 3,284,651 | 11/1966 | Wesolowski | 310/168 |
| 2,500,730 | 3/1950 | Yonkers | 310/168 |
| 3,304,450 | 2/1967 | Bosco et al. | 310/168 |
| 2,119,477 | 5/1938 | Weydell | 310/168 |
| 2,108,662 | 2/1938 | Fisher | 310/168 |
| 2,769,106 | 10/1956 | Dembowski | 310/168 |
| 3,098,164 | 7/1963 | Inoue | 310/168 |
| 3,375,422 | 3/1968 | Boudigues | 318/254 X |
| 3,493,800 | 2/1970 | Barrett | 310/263 X |
| 3,386,019 | 5/1968 | Hill | 318/254 X |
| 3,274,471 | 9/1966 | Moczala | 318/254 X |
| 3,419,782 | 12/1968 | Sheldrake et al. | 318/254 X |
| 3,242,405 | 3/1966 | Ikegami | 318/254 X |
| 3,517,289 | 6/1970 | Brunner et al. | 318/254 X |
| 3,339,133 | 8/1967 | Favre | 318/254 X |

Primary Examiner—G. R. Simmons
Attorney—Flehr, Hohbach, Test, Albritton & Herbert

[57] ABSTRACT

Brushless rotating machine having a fixed winding for producing a magnetic field in the rotating armature or rotor. A plurality of stator windings is provided around the armature, and a rotating magnetic field is produced in these windings by a non-mechanical commutator. A non-mechanical sensor is provided for detecting the position of the armature and controlling the commutation in accordance therewith.

5 Claims, 13 Drawing Figures

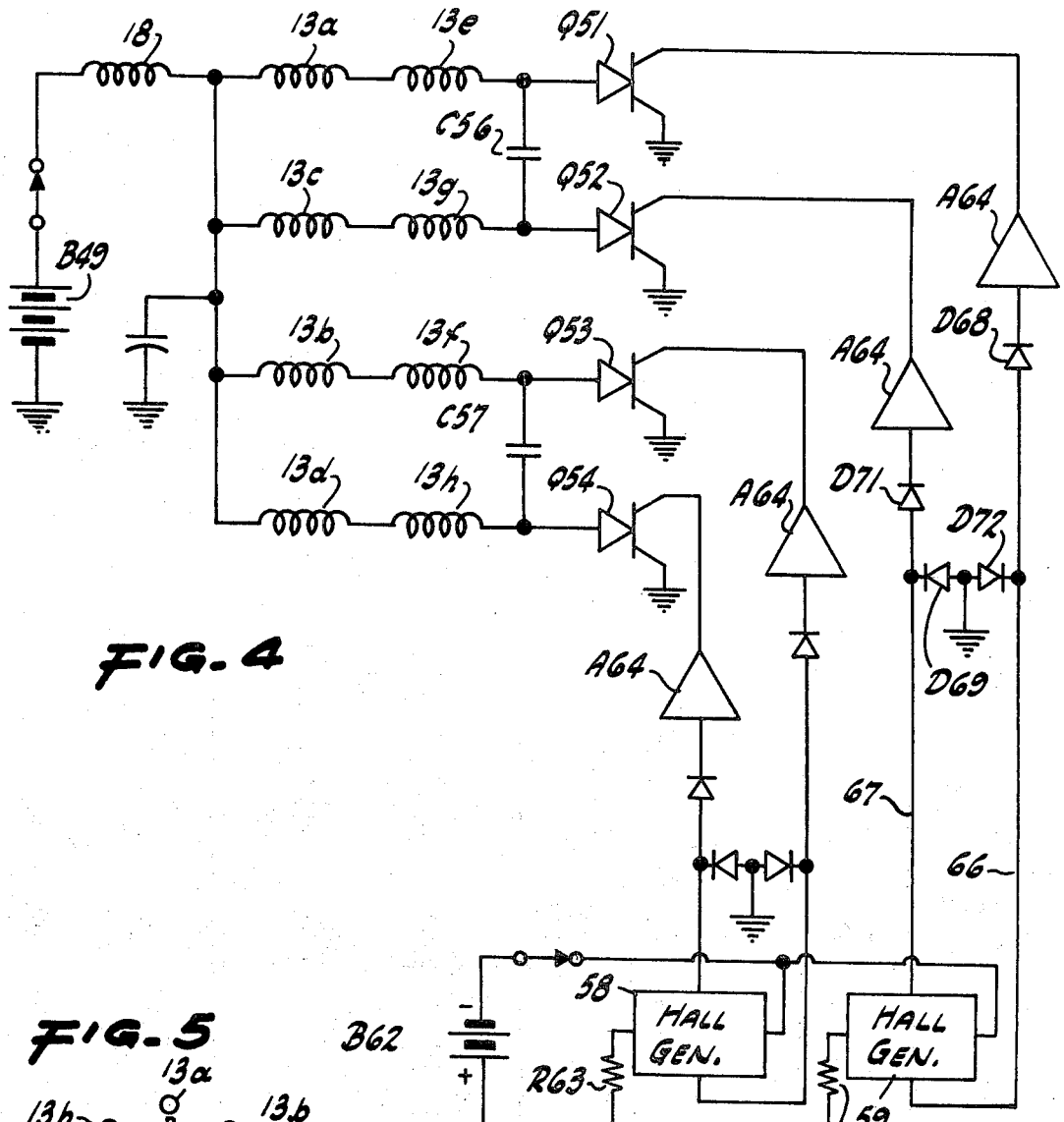
FIG. 4
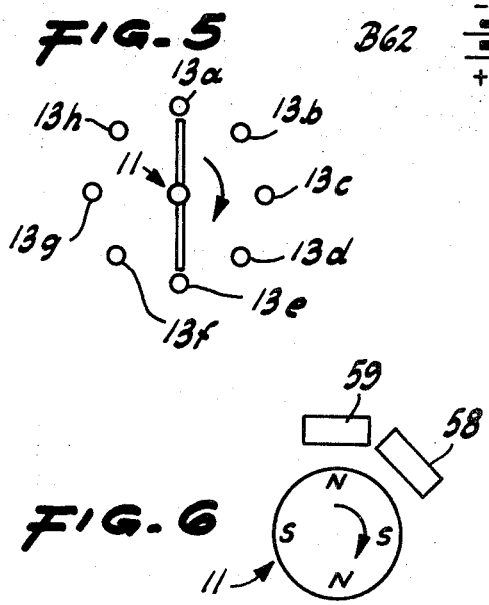
FIG. 5
FIG. 6
INVENTOR
DONALD W. CAROW
BY
Flehr, Hohbach, Test,
Albritton & Herbert
ATTORNEYS

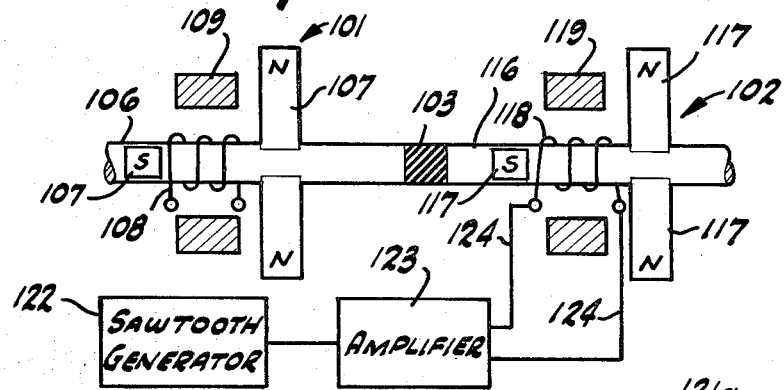
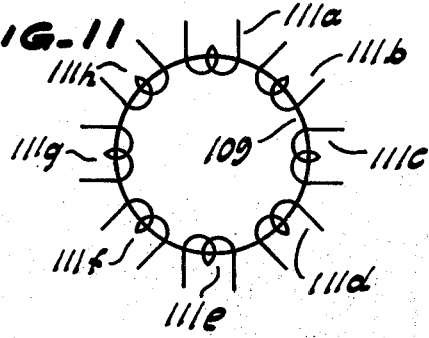
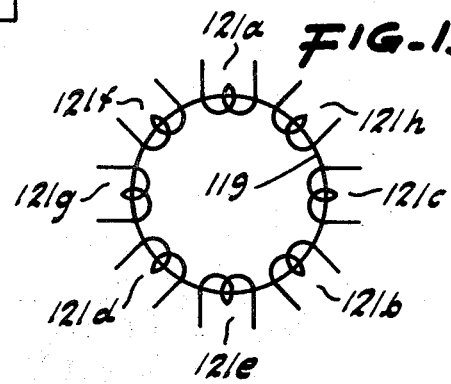
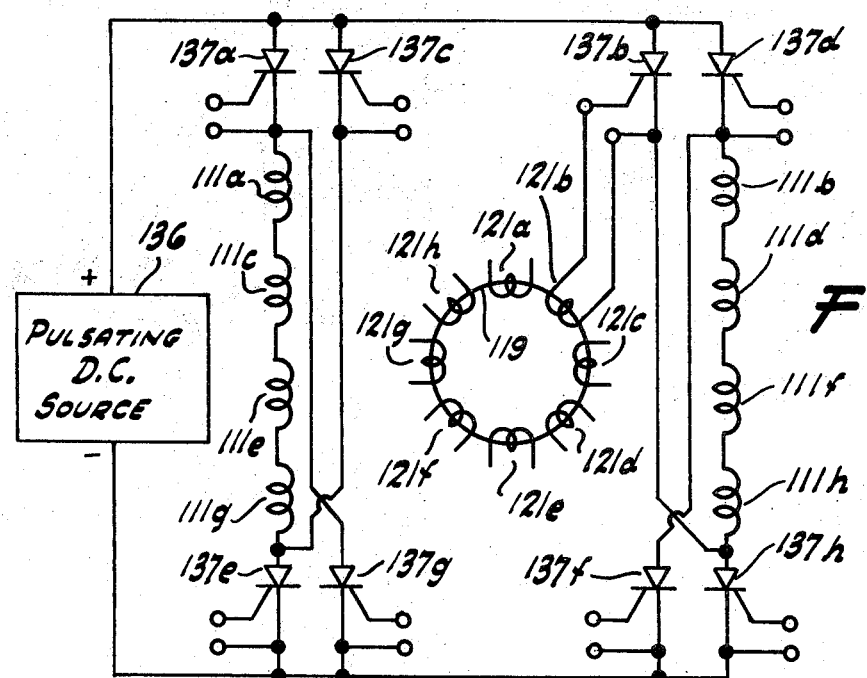
INVENTOR
DONALD W. CAROW

ROTATING ELECTRICAL MACHINE

BACKGROUND OF THE INVENTION

This invention pertains generally to rotating electrical machinery and more particularly to a brushless machine which can be operated as a motor or generator.

Direct current rotating machines heretofore provided have generally included an armature winding mounted on the rotating shaft of the machine. This winding rotates with the shaft and therefore is subject to strong centrifugal forces which can damage the winding. The winding contributes significantly to the moment of inertia of the shaft, and in large machines, such as a motor for an electrically driven automobile, this high inertia can limit the acceleration and top speed of the motor. In addition, with a rotating armature winding, it is necessary to use brushes or a commutator to provide electrical connections to the winding. Brushes and commutators are not efficient conductors, they wear rapidly, produce R.F. noise, and also limit the top speed of the machine. There is, therefore, a need for a new and improved machine and method which overcomes the foregoing and other problems encountered with rotating machines heretofore provided.

SUMMARY AND OBJECTS OF THE INVENTION

The brushless machine of the present invention has no rotating armature winding. The rotating shaft of the machine is fabricated of a magnetically conductive material, and a magnetic field is produced therein by a fixed winding or fixed permanent magnets disposed in proximity to the rotating shaft. A plurality of stator windings is provided, and a rotating magnetic field is produced in these windings by energizing them in a predetermined sequence with a non-mechanical commutator. Non-mechanical means is provided for sensing the position of the rotating shaft and controlling the commutation in accordance therewith.

It is in general an object of the present invention to provide a new and improved brushless rotating machine.

Another object of the invention is to provide a machine of the above character which can be operated as either a motor or a generator.

Another object of the invention is to provide a machine of the above character which has no rotating armature winding.

Another object of the invention is to provide a machine of the above character which includes non-mechanical commutator means for producing a rotating magnetic field.

Additional objects and features of the invention will be apparent from the following description in which the preferred embodiments are set forth in detail in conjunction with the accompanying drawings.

BRIEF DESCRIPTION OF THE DRAWINGS

FIG. 4 is a circuit diagram of one embodiment of electronic commutator which can be used in a motor of the type shown in FIG. 1.

FIG. 5 is a schematic illustration of the location of the field windings connected to the commutator in FIG. 4.

FIG. 6 is a schematic illustration of a hall effect generator for use in the commutator of FIG. 4.

FIG. 10 is a schematic illustration of a motor of the type shown in FIG. 7 which includes means for sensing the position of the armature.

FIG. 11 is a schematic illustration of the location of the field windings in the motor shown in FIG. 10.

FIG. 12 is a schematic diagram of one embodiment of an electronic commutator for use in the motor embodiment shown in FIG. 10.

FIG. 13 is a schematic illustration of an alternate arrangement of sensor windings in the commutator shown in FIG. 12.

DESCRIPTION OF THE PREFERRED EMBODIMENTS

Figure 1:
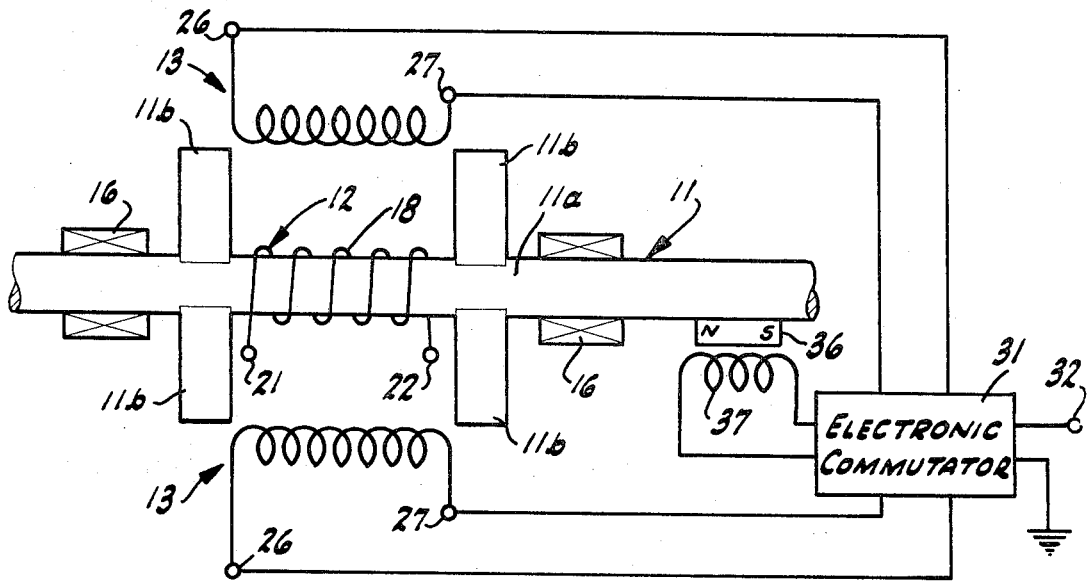
FIG. 1 is a schematic illustration of one embodiment of a brushless direct current machine having a fixed armature winding and incorporating the present invention, the machine being shown connected for operation as a motor.

The machine illustrated in FIG. 1 includes an armature member or rotor 11, fixed means 12 for producing the magnetic field in the armature member, and a plurality of field windings 13.

The armature member or rotor 11 includes a generally cylindrical axially extending portion 11a and a plurality of radially extending arms 11b. As discussed hereinafter in detail, the arms 11b cooperate with the stator windings 13 to produce rotation of the armature member 11. The number of arms can be chosen as desired, but it is desirable from the standpoint of mechanical balance that these arms be provided in diametrically opposed pairs. In the embodiment shown in FIG. 1, the arms are also disposed in axially spaced apart, parallel pairs. The armature member is fabricated of a magnetically conductive material, and preferably this material should have a permeability substantially greater than that of air. Conventional pulleys, sprockets, gears, and the like can be mounted on the cylindrical portion 11a to provide means for connecting the armature member 11 to loads and motive means.

The armature member 11 is rotatably mounted in bearings 16. These bearings are adapted to be mounted in the frame of the machine and can be conventional bearings such as sleeve bearings, ball bearings, roller bearings, and the like.

As illustrated in FIG. 1, the fixed means 12 for producing a magnetic field in the armature member comprises a fixed central winding 18 disposed coaxially of the cylindrical portion 11a of the armature member. This winding is fabricated of an electrically conductive material and is provided with terminals 21, 22 adapted for connection to a source of electrical energy. The winding 18 is adapted to be mounted in a fixed position relative to the frame of the machine and does not rotate with the armature member 11. When energized, the winding 18 produces a magnetic field which is concentrated in the armature member and the air gap between the winding and member. The magnetic flux also exists in the axially spaced parallel arms 11b and in generally planar fields intermediate the axially spaced parallel arms 11b. It should be noted that even though the winding 18 is fixed in position, the generally planar fields produced by it intermediate the arms 11b do rotate with the armature member. If desired, the winding 18 can be concentrated in the vicinity of the arms 11b to intensify the magnetic field in these arms. Likewise, additional central windings can be provided.

If desired, the winding 18 can be fabricated of a tubular material, such as copper tubing, through which a coolant can be passed. If desired, the winding could be superconductive.

The stator windings 13 are circumferentially spaced apart and disposed around the central member 11 and armature winding 18. In the embodiment shown in FIG. 1, each of the windings 13 is wound about an axis generally parallel to the axis of the armature member 11, the ends of the windings 13 being disposed proximate to the outer ends of the radially extending arms 11b. Each of the windings 13 is connected to electrical terminals 26, 27. These terminals are adapted for connection to a source of electrical energy when the machine is operated as a motor. When the machine is operated as a generator, with the winding 18 energized, the current produced by the machine is available at these terminals. Alternatively, the windings 13 can be energized to generate single phase alternating current in the winding 18.

As illustrated in FIG. 1, electronic commutator means 31 is provided for energizing the windings 13 in a predetermined sequence to produce a magnetic which rotates around the axis of the armature member 11. A terminal 32 is provided for connecting the commutator means to a source of electrical energy, and the commutator means can include any of a number of conventional circuits for sequentially connecting the field coils to the source of electrical energy. Examples of suitable commutator circuits are found in U.S. Pat. Nos. 3,364,407, issued Jan. 16, 1968, and 3,214,663, issued Oct. 26, 1965. Suitable commutators include electronic switching devices, such as switching transistors and silicon controlled rectifiers, connected to each of the field windings 13. The switching devices are triggered by a signal derived from the rotating armature member 11 to provide proper timing of the rotating field. If desired, the commutator can include means for reversing the field in each of the windings 13 as the arms 11b pass thereby. Thus, as the arms approach the winding they will be attracted to it, and as they depart they will be repelled.

Means is provided for sensing the rotational position of the armature member 11 and controlling the electronic commutator 31 in accordance therewith. In FIG. 1, this means is shown as including a small permanent magnet 36 mounted on the armature member and a fixedly mounted pick-up coil 37 connected to the commutator. With this sensor, a trigger signal is produced when the magnet 36 passes near the coil 37. If desired, additional pick-up coils 37 can be circumferentially spaced about the armature member for detecting a plurality of armature positions.

Alternatively, a Hall effect generator can be used for sensing the rotational position of the armature member 11. Such a system typically consists of a magnet attached to a rotating shaft, such as the armature member 11, and when the shaft rotates to a position wherein the field produced by the magnet is normal to the Hall generator, a voltage is developed. The voltage so produced can be used to trigger the commutator 31.

If desired, other well known types of sensors can be used instead of those described herein. Such sensors include a variable capacitor having a first plate mounted on the armature member and a second plate mounted in a fixed position. Likewise, a sensor comprising a light source and a light sensing element, such as a photocell, can be used.

Operation of the machine illustrated in FIG. 1 as a direct current motor can now be described briefly. Let it be assumed that the terminals 21, 22, and 32 have been connected to a source of direct current. With the winding 18 energized, a magnetic field is produced in the armature member 11. As described hereinbefore, this field is concentrated in the generally planar regions intermediate the axially opposed radial arms 11b, and these concentrated regions rotate with the armature member. The windings 13 are sequentially energized by the electronic commutator means 31 to produce a rotating magnetic field. This field cooperates with the concentrated regions of the field in the armature members to cause rotation of the armature member.

The machine illustrated in FIG. 1 can be operated as a generator by energizing the winding 18 and driving the armature member 11 by suitable motive means, such as a gasoline engine or turbine. In this case, the commutator and means for sensing the position of the armature member are not needed. As the armature member rotates, the concentrated regions of the magnetic field intermediate the arms 11b produce electric current in the windings 13 as they move past these windings. This current is available at the terminals 26, 27. Alternatively, the windings 13 can be energized in which case single phase alternating current will be generated in the winding 18.

The numbers of radially extending arms 11b and windings 13 can be chosen as desired. The windings can be connected in series or parallel to provide the operating characteristics desired. If desired, the arms 11b can be formed in shapes for providing additional functions, such as cooling vanes.

Figure 2:
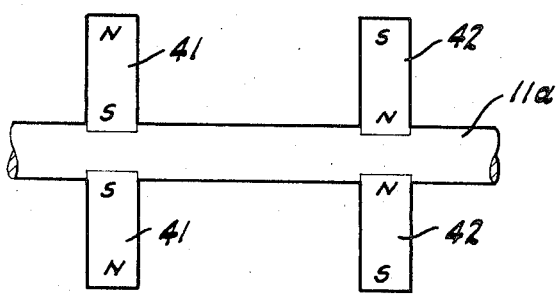
FIG. 2 illustrates an alternate embodiment of an armature which can be incorporated in the machine shown in FIG. 1.

It has been found that the armature field can be enhanced by permanently magnetizing the radially extending arms of the armature member. Such magnetization is readily provided by the use of permanent magnets 41, 42, as illustrated in FIG. 2. As shown in the drawing, the magnets 41 at one end of the armature member are all disposed with their south poles adjacent the axially extending portion 11a, and the magnets 42 at the other end of the member are disposed with their north poles adjacent the central portion. With the arms 11b permanently magnetized in this manner, the winding 18 should be energized in such manner that the magnetic field produced by it cooperates with the fields produced by the magnetized arms. Thus, when the armature shown in FIG. 2 is used in the motor shown in FIG. 1, the terminal 21 should be connected to the positive terminal of the direct current source.

Figure 3:
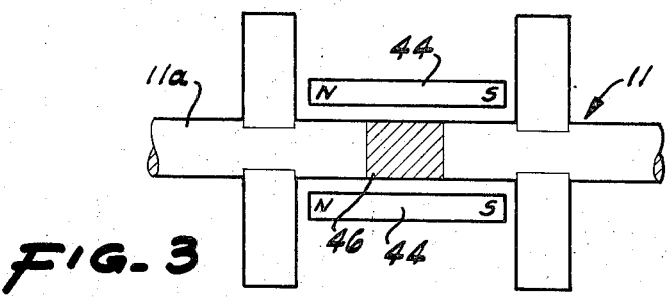
FIG. 3 illustrates the use of permanent magnets rather than the armature winding for producing a magnetic field in the armature of the machine shown in FIG. 1.

The magnetic field of the armature member 11 can be produced by means of a permanent magnet, rather than an exciter winding. Thus, FIG. 3 illustrates permanent bar magnets 44 disposed in proximity to the central portion 11a of the armature member. Like the winding 18, these magnets are secured to the frame of the machine and do not rotate with the armature member. In this embodiment, the central portion 11a of the armature member is formed to include a magnetically insulative portion 46 to provide isolation between the arms at the opposite ends of the armature member. If desired, other types of permanent magnets, such as a sleeve magnet, can be used in place of the bar magnets illustrated in FIG. 3.

FIGS. 4–6 illustrate one embodiment of an electronic commutator for a direct current motor of the type shown in FIG. 1 and having eight circumferentially spaced apart stator windings 13a–13h. Each of the diametrically opposed pairs of windings, such as the pair 13a, 13e is connected in series with the winding 18 and with a source of direct current B49. The passage of the current through the pairs of stator windings is controlled by a plurality of silicon controlled rectifiers Q51–Q54, with one of the SCRs being connected in series with each of the pairs of stator windings. A capacitor C56 is connected between the anodes of the SCRs Q51, Q52, and a capacitor C57 is connected between the anodes of the SCRs Q53, Q54.

Hall effect generators 58, 59 are provided for controlling the conductivity of the SCRs Q51–Q54 in accordance with the rotational position of the armature member 11. Each of these generators is connected to a source of direct current B62 through resistors R63, R63. The armature member 11 is provided with alternate north and south poles, as illustrated in FIG. 6, and the Hall generators are disposed in proximity to the armature member. The outputs of the Hall generators are connected to the cathode gates of the silicon controlled rectifiers Q51–Q54 through a plurality of diodes and amplifiers A64. The amplifiers A64 are D.C. amplifiers of low impedance output and are included to increase the output of Hall effect generators to a level sufficient to trigger SCRs.

Operation of the commutator shown in FIGS. 4–6 can now be described briefly. Current from the source B62 flows through each of the Hall generators and resistors 63. Whenever the magnetic field produced by the poles in the armature member 11 is perpendicular to one of the Hall generators, an output voltage is produced by that Hall generator. The polarity of the voltage so produced is dependent upon the polarity of the source B62 and the direction of the field produced by the armature member.

Considering the Hall effect generator 59, let it be assumed that the instantaneous voltage produced by the Hall generator is such that the conductor 66 connected to the bottom side of the generator is positive relative to the conductor 67 connected to the top side of the generator. The positive voltage is applied to the gate of the SCR Q51 through a diode D68 and amplifier A64, and the negative voltage is connected to ground through a diode D69. The SCR Q51 is thus turned on, and the stator windings 13a and 13e are energized from the source B49. At this time, the capacitor C56 is charged with its upper plate negative relative to its lower plate by current from the source B49.

When the armature member 11 rotates to the position which produces a positive voltage in the conductor 67 relative to the conductor 66, the positive voltage is applied to the gate of the SCR Q52 through a diode D71 and an amplifier A64, and the negative voltage is grounded through a diode D72. At this time, the SCR Q52 is turned on, and current flow through the windings 13c and 13g. The lower plate of the capacitor C56 is grounded through the SCR Q52, applying the negative charge on the upper plate to the anode of the SCR Q52 and turning off this SCR. During this phase of the operation, the lower plate of the capacitor C56 is charged negatively relative to the upper plate. When the armature member moves to the next position in which the positive voltage appears in the lead 66, the SCR Q51 is turned on and the SCR Q52 is turned off in the manner described above.

The Hall effect generator 58 and capacitor C57 control the conductivity of the SCRs Q53 and Q54 in the same manner that the generator 59 and capacitor C56 control the SCRs Q51 and Q52. With polarities shown and the Hall effect generators 58 and 59 separated by an angle of 45 degrees, as shown in FIG. 6, the pairs of stator windings are energized in the following sequence: 13a–13e, 13b–13f, 13c–13g, 13d–13h, 13a–13e, and so on. Thus, the necessary rotating fields are provided for a four pole motor.

Figure 7:
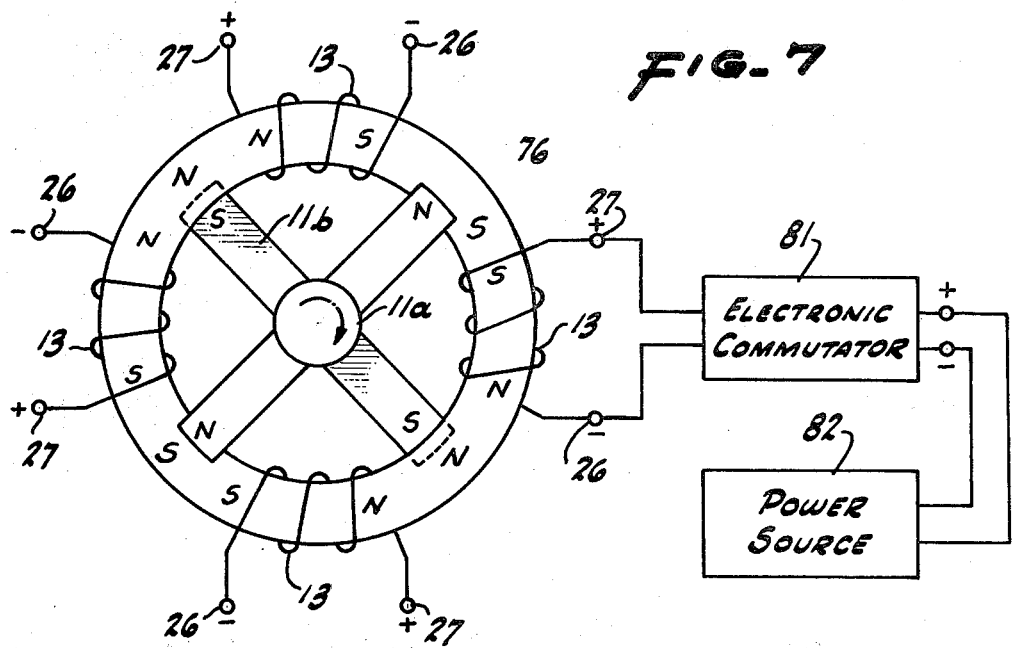
FIG. 7 is a schematic illustration of one embodiment of a brushless motor having a fixed armature winding and an annular field core.
Figure 8:
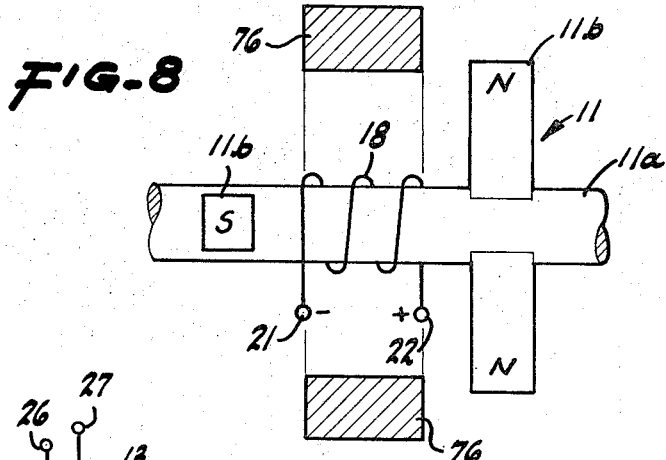
FIG. 8 is another schematic illustration of the embodiment shown in FIG. 7.

FIGS. 7 and 8 illustrate an embodiment of the invention wherein the stator windings 13 are wound on an annular core 76. As illustrated, for stator windings 13 are provided, and they are spaced apart in quadrature around the annular core. In a practical machine, it may be desirable to utilize more than four stator windings on the annular core 76, and it is for convenience of illustration and description that only four such windings are shown herein.

The annular core 76 is disposed coaxially of the central portion 11a of the armature member 11. One pair of diametrically opposed, radially extending arms 11b is provided on either side of the core. These arms on the two sides of the core are normal to each other, rather than being parallel as in the embodiment shown in FIG. 1. The axial spacing between the pairs of arms 11b should preferably be on the order of one-fourth the circumferential length of the annular core 76. The fixed armature winding 18 is disposed coaxially of the central portion 11a of the armature member.

The adjacent windings 13 are wound on the core 76 in opposite directions, as can be seen in FIG. 7. Each of these windings is provided with terminals 26, 27. In one preferred embodiment, all of the terminals 26 are connected together and connected to one terminal of a source of direct current, with the terminals 27 connected to the other terminal of the source. With this arrangement, the magnetic fields produced in the core 76 by the adjacent coils are opposite in polarity, with the result that strong magnetic poles are produced intermediate the windings 13, as indicated in FIG. 7.

Means is provided for reversing the polarity of the voltage applied to the windings 13. In FIG. 7, this means is shown as an electronic commutator 81 connected intermediate a power source 82 and one of the winding 13. For convenience of illustration, the connections to the remaining field windings are not shown. If desired, other types of switching devices can be used instead of the commutator 81.

Operation and use of the embodiment shown in FIGS. 7 and 8 can now be described briefly. Let it be assumed that the winding 18 has been connected to a source of direct current in such manner that magnetic poles are produced in the arms 11b in the manner illustrated in FIG. 7. Further, let it be assumed that the windings 13 are energized in such manner that the terminals 27 are positive. This produces the magnetic poles in the core 76 illustrated in FIG. 7. Thus, as the arms 11b move away from the windings 13, they are attracted toward the magnetic poles in the core intermediate the windings. When the arms 11b are approximately half way between the windings 13, the current in these windings is reversed, thereby reversing the magnetic poles in the core 76. When this occurs, the arms 11b are repelled away from the poles in the core toward the windings 13. Because of its momentum, the armature member continues to rotate in a single direction, the direction in which it has been moving, rather than oscillating back and forth. The current in the windings 13 is again reversed as the arms 11b pass these windings. By continuously reversing the polarity of the current in the field windings in the manner hereinbefore described, continuous rotation of the armature member is provided.

Figure 9:
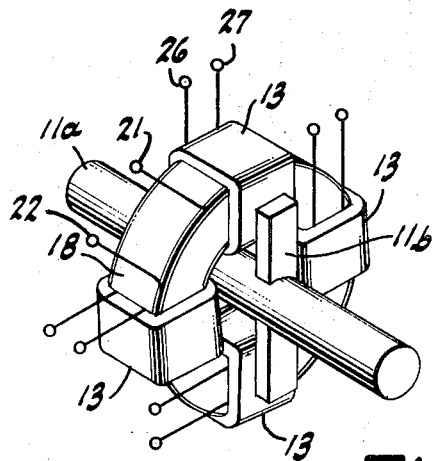
FIG. 9 illustrates another embodiment of a motor of the type shown in FIGS. 7 and 8.

FIG. 9 illustrates an alternate embodiment of the motor illustrated in FIGS. 7 and 8. In this embodiment, the winding 18 is formed of a material having a high magnetic permeability, such as iron, and the windings are disposed in close proximity to each other to provide an annular pass of magnetic conductivity. The stator windings 13 are wound directly on the winding 18 and are circumferentially spaced apart around it. Thus, in addition to providing an electrically conductive path for the armature current, the winding 18 also provides a magnetically conductive path for the flux produced by the stator windings.

FIGS. 10-13 illustrate one embodiment of an electronic commutator which can be used in a motor of the type illustrated in FIGS. 7-9. In this embodiment, the armature includes two magnetically conductive sections 101 and 102 separated by an insulative section 103. The section 101 is associated with the working portion of the motor, and the section 102 is associated with means for sensing the position of the rotating armature and controlling the commutator in response thereto.

The armature section 101 includes an axially extending cylindrical portion 106 and two pairs of radially extending arms 107 similar to the arms 11b in FIG. 7. A fixed winding 108 and an annular core 109 are disposed coaxially of the central portion 106. A plurality of stator windings 111a–111h are wound on the core 109 in a circumferentially spaced apart manner, as illustrated in FIG. 11.

The sensing section 102 of the armature includes an axially extending central portion 116 and two pairs of radially extending arms 117. A fixed winding 118 and annular core 119 are disposed coaxially of this central portion 116. A plurality of sensing windings 121a-121h is wound on the core 119 in a circumferentially spaced apart manner, as illustrated in FIG. 12.

Means is provided for energizing the winding 118. This means includes a sawtooth generator 122 of conventional design. The output of the sawtooth generator is amplified by an amplifier 123 and connected to the winding 118 through circuits 124.

Alternate of the stator windings are connected in series to provide two sets, one of which includes windings 111a, 111c, 111e and 111g. The other set includes windings 111b, 111d, 111f, and 111h. Each of these sets is connected in series with a source of pulsating direct current 136 through a plurality of silicon controlled rectifiers 137a–137h. The cathode and gate of each of the SCRs are connected to a corresponding sensing winding 121a–121h. For convenience of illustration, only the SCR 137b is shown connected to its corresponding winding in FIG. 12. However, it is to be understood that the remaining SCRs and sensing windings are similarly connected.

Operation and use of the embodiment illustrated in FIGS. 10–12 can now be described briefly. Let it be assumed that the winding 108 has been connected to a source of direct current. As the arms 117 pass the sensing coils 121a–121h, the sawtooth wave form in the winding 118 produces a signal in the sensing windings indicative of the position of the armature. Because of the transformer action of the windings, the sawtooth wave form is differentiated to produce pulses in the sensing windings. The pulses produced in the diagonally opposed windings are similar in polarity, and the pulses in the windings in quadrature with them are of the opposite polarity. Thus, for example, if the pulses produced in the windings 121a and 121e are positive, the pulses produced simultaneously in the windings 121c and 121g are negative. The silicon controlled rectifiers 137a and 137e are turned on by the positive pulses in the windings 121a and 121e, respectively. Thus, the series of windings 111a, 111c, 111e and 111g is energized with its upper end connected to the positive terminal of the source 136. These windings remain energized until the SCR's are no longer triggered and the pulsating DC from the source falls to zero, turning off the SCRs 137a and 137e.

As the armature rotates in a clockwise direction to its next position, positive pulses are produced in the sensing windings 121b and 121f. The SCRs 137b and 137f are turned on, energizing the series of windings 111b, 111d, 111f, and 111h with the top end of this series connected to the negative terminal of the source. In the next position, the SCRs 137c and 137g are turned on, connecting the top end of the series 111a–111g to the negative terminal. Thus, a rotating magnetic field is produced in the annular core 109 which reacts with the field in the armature winding 108 to produce rotation of the armature.

With this commutator, the direction of rotation of the motor can be reversed simply by rotating the alternate sensing windings by an angle of 90°, as illustrated in FIG. 13. Another method would be to exchange the wires 124 connected to coil 118.

It is apparent from the foregoing that a new and improved rotating electrical machine and method have been provided. While the invention has been described primarily in relation to D.C. motors and generators, it is also applicable to other types of electrical machines. For example, control transformers, servomotors, and servogenerators heretofore provided require a rotating armature winding and slip rings. Likewise, conventional A.C. shunt and series wound motors have rotating armature windings and brushes. By eliminating the need for rotating armature windings and slip rings and/or brushes in such machines, the present invention also eliminates the problems associated therewith. While only the presently preferred embodiments of the invention have been described hereinbefore, as will be apparent to those familiar with the art, certain changes and modifications can be made without departing from the scope of the invention as defined by the following claims.

I claim:

1. In a rotating electrical machine of the type particularly adapted for generating electrical energy, rotor means including a rotatably mounted axially extending core portion and a plurality of axially spaced apart arms extending from the ends of said core portion, stationary means mounted proximate said core portion for producing a magnetic field which rotates with said rotor means, at least one electrically conductive winding wound on a path of magnetic material disposed within the rotating magnetic field produced by said stationary means and said rotor means, said path being generally perpendicular to a line radially extending from said core portion, said path passing through said winding axially thereof, said stationary means includes a permanent magnet and said core portion is formed in two axially spaced apart magnetically insulative section intermediate said magnetically conductive sections.

2. In a rotating electrical machine, rotor means including a rotatably mounted axially extending central portion and a plurality of axially spaced apart arms extending from said central portion, stationary means mounted proximate said central portion for producing a magnetic field adapted for rotation with said rotor means, a toroidal core of magnetic material disposed generally coaxially of the central portion of said central portion and intermediate said axially spaced apart arms, and a plurality of windings wound on said toroidal core, said toroidal core passing through said windings.

3. In a rotating electrical machine, rotor means comprising a rotatably mounted axially extending shaft and a plurality of axially spaced apart arms extending from said shaft, at least two of said arms being fabricated of magnetic material, a continuous path of magnetic material disposed coaxially of the shaft, a stationary winding disposed coaxially of said shaft, means for producing an electrical sawtooth waveform in said winding, and a plurality of sensing windings wound around said path in such manner that said path passes axially through said windings.

4. In a rotating electrical machine of the type particularly adapted for generating electrical energy, rotor means including a rotatably mounted axially extending core portion and a plurality of axially spaced apart arms extending from the ends of said core portion, stationary means mounted proximate said core portion for producing a magnetic field which rotates with said rotor means, at least one electrically conductive winding wound on a path of magnetic material disposed within the rotating magnetic field produced by said stationary means and said rotor means, said path being generally perpendicular to a line radially extending from said core portion, said path passing through said winding axially thereof, said stationary means including a permanent magnet and said core portion being formed in two axially spaced apart magnetically conductive sections with a magnetically insulative section intermediate said magnetically conductive sections.

5. In a rotating electrical machine, rotor means comprising a rotatably mounted axially extending central portion and a plurality of axially spaced apart arms extending from said core portion, a stationary winding having at least one turn fabricated of electrically and magnetically conductive material disposed coaxially of the central portion of said rotor means, and a plurality of circumferentially spaced apart windings wound on said stationary winding, the at least one turn of said stationary winding passing axially through said spaced apart windings.

* * * * *